ANALOG TO DIGITAL CONVERTER

Filed Jan. 8, 1965 Sheet 1 of 2

INVENTOR.
JOSEPH J. BELET

BY Elmer Galbiati

ATTORNEY

United States Patent Office 3,422,424

Patented Jan. 14, 1969

3,422,424

ANALOG TO DIGITAL CONVERTER

Joseph J. Belet, San Jose, Calif., assignor to International Business Machines Corporation, New York, N.Y., a corporation of New York

Filed Jan. 8, 1965, Ser. No. 424,360

U.S. Cl. 340—347 7 Claims

Int. Cl. H04l *3/00;* H03k *13/00*

ABSTRACT OF THE DISCLOSURE

A system for converting analog voltages to digital voltages. A modulated reference voltage is transmitted to a floating analog voltage input section. The modulated reference signal is added to the analog input signal and the resulting sum is sampled. The sampled sum is transmitted to a level detector which is not located in said floating section. The output of the level detector changes the value stored in a register which in turn changes the value of the reference voltage. This proceeds until said sum equals zero or changes polarity at which time the number in said register represents the digital value of the analog input signal.

The present invention relates to electronic circuitry and more particularly to a circuit for converting analog signals to digital signals.

There are two main types of electrical analog signals. The first type is termed single ended and the second type is termed double ended. A single ended analog signal is a voltage which appears between a single line and ground. A double ended analog signal is a voltage which appears between two lines. One of the main problems involved in converting double ended analog signals to digital signals is that the covnersion circuitry must reject signals which appear between both of the wires and ground. Such signals are termed common mode signals.

One of the techniques used to achieve common mode rejection is to provide a floating section on the input of the analog to digital converter. The floating section is electrostatically isolated from ground such that the circuitry in the floating section only responds to voltages which appear between the two lines of the input and it does not respond to common mode signals. A circuit of this general type is shown in co-pending application, Ser. No. 115,113, now Patent No. 3,216.003 filed June 6, 1961, by Howard L. Funk et al., which is assigned to the assignee of the present invention.

In circuits such as that shown in the above referenced co-pending application, it is necessary to transmit a reference signal from the main portion of the analog to digital converter to the floating section. The input signal is then compared to the reference signal and any differences in magnitude is used to appropriately change the magnitude of the reference signal until the reference signal equals the input signal. One way of transmitting a reference signal to the floating section is to modulate the reference signal so that it can be passed through a transformer to the floating section. In the floating section the modulated signal is demodulated in order to generate a D.C. reference signal which is compared to the analog input signal.

The present invention provides an improved circuit which eliminates the need for a demodulator in the floating section. Furthermore, the circuit of the present invention is easier to calibrate and it is not affected by amplifier offset voltages.

An object of the present invention is to provide an improved analog to digital converter.

Another object of the present invention is to provide an improved low level analog to digital converter.

Still another object of the present invention is to provide a relatively inexpensive low level analog to digital converter.

Still another object of the present invention is to provide an analog to digital converter which has a minimum number of components in the floating section.

Yet another object of the present invention is to provide an analog to digital converter which is insensitive to amplifier offset voltages.

A further object of the present invention is to provide an improved analog to digital converter with simplified means for handling both positive and negative input signals.

The above and other objects and advantages of the present invention are achieved by a circuit which includes a floating section and means for transmitting a modulated reference voltage to said floating section. The modulated signal is added to the input signal in the floating section and the resulting sum is sampled. The sampled sum is transmitted to a level detector which is not located in said floating section. The output of the level detector changes the value stored in a register which in turn changes the value of the reference voltage. This proceeds until said sum equals zero or changes polarity at which time the number in said register represents the digital value of the analog input signal.

Other and further objects and advantages of the invention will be apparent from the following more particular description of the preferred embodiment of the invention, as illustrated in the accompanying drawings in which.

Figure 1:
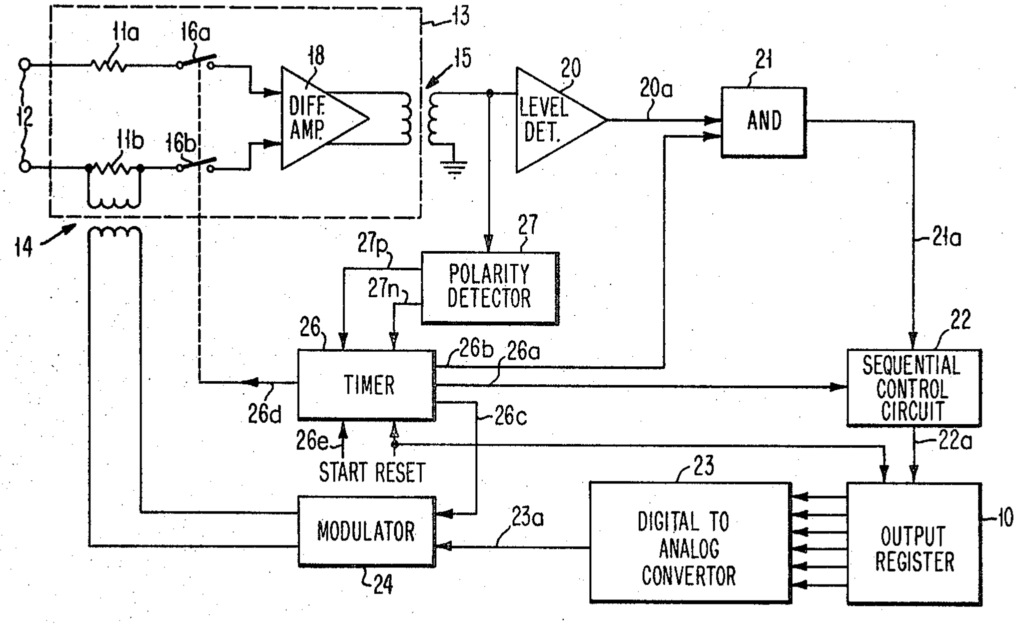
FIGURE 1 is a block diagram of a preferred embodiment of the present invention.

A preferred embodiment of the invention is shown in FIGURE 1. The circuit shown receives a differential analog input signal between terminals 12 and it generates a digital number in output register 10 which indicates the magnitude of the voltage applied between terminals 12. The circuit includes a floating section 13 which is electrostatically isolated from the remaining portions of the circuit and from the system ground. Two pulse transformers 14 and 15 connect the floating section 13 to the remaining portions of the circuitry. Transformer 14 transmits a modulated reference signal to the floating section 13 and transformer 15 transmits a signal from the floating section to the remaining portions of the circuitry. The floating section 13 includes two resistors 11*a* and 11*b*, two switches 16*a* and 16*b* and a differential amplifier 18. (Another transformer connection to the floating section 13 will later be described. This third transformer carries control voltages for switches 16.)

The output of transformer 14 is connected across resistor 11*b*. Thus, the analog input signal from inputs 12 and the modulated reference signal transmitted through transformer 14 are effectively summed. For reasons which will be apparent later, this sum is referred to as an error signal. Switches 16*a* and 16*b* are normally opened. However, at an appropriate time they are closed to sample the error signal. The sample of the error signal is amplified by differential amplifier 18 and then transmitted through transformer 15. The circuitry which will be explained in detail later responds to the output of transformer 15 and it adjusts the magnitude of the modulated reference voltage until the magnitude of the error signal reaches zero (or changes polarity). When the ERROR signal equals zero, the reference signal must equal the input signal. The magnitude of the reference signal is controlled by the number in register 10, hence when the error signal equals zero the number in register 10 equals the input signal.

The circuitry which responds to the signal transmitted through transformer 15 and which generates the modulated reference signal includes circuitry which controls the magnitude of the number stored in output register 10 and circuitry which generates a reference signal the magnitude of which is related to the magnitude of the number stored in register 10. The circuitry which controls the number stored in output register 10 includes level detector 20, AND gate 21, and sequential control circuit 22. When level detector 20 detects a signal at the output of transformer 15, it sends a pulse through AND gate 21 to sequential control circuit 22. Sequential control circuit 22 then generates a pulse on line 22*a* which increments by one unit the number stored in output register 10. The timing of these operations will be explained later.

The reference signal supplied to transformer 14 is generated by digital to analog converter 23 and modulator 24. Digital to analog converter 23 generates an analog signal at output 23*a* the magnitude of which represents the magnitude of the number stored in register 10. Modulator 24 modulates the signal appearing on line 23*a.* The output of modulator 24 is connected to the input of transformer 14. The operation of circuits 20 to 24 is under control of a timer 26 and the sequence of pulses generated by timer 26 is under control of polarity detector 27. The pulses generated by timer 26 are shown in FIGURES 2 and 3.

Figure 2:
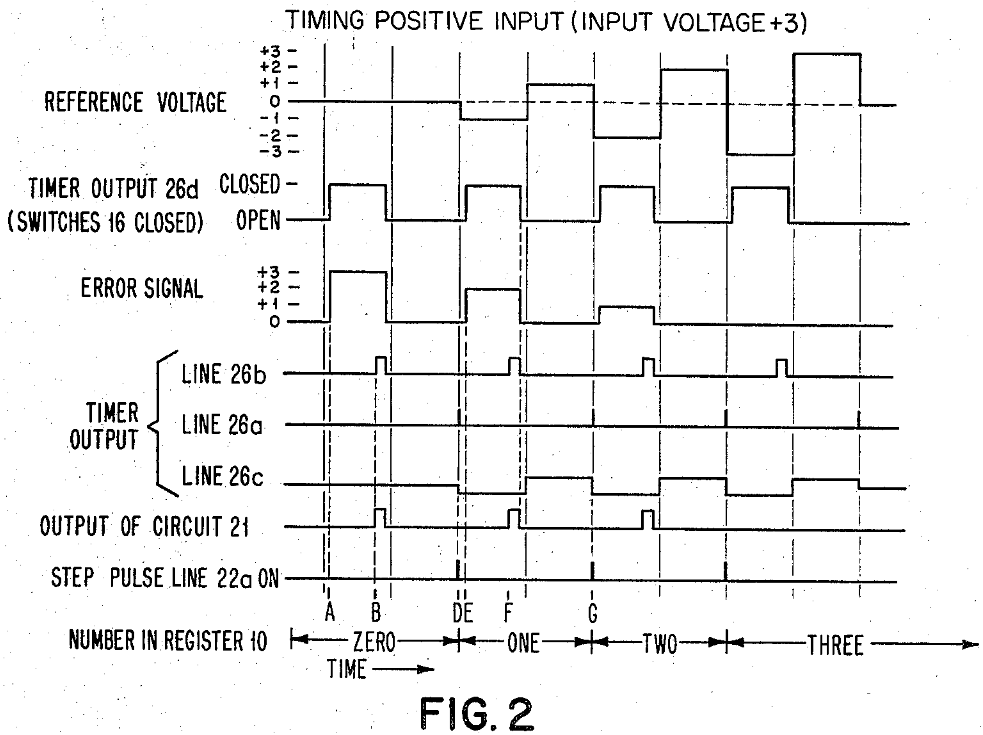
FIGURE 2 shows the waveforms during a positive conversion.

The sequence of operations during the conversion of a positive input is illustrated in FIGURE 2. The sequence of operations during the conversion of a negative input signal is illustrated in FIGURE 3. The first part of each cycle deals (from time A to time D) provides a determination of the polarity of the input signal. This part of the cycle will be explained later. For purposes of the present explanation it is sufficient to say that within the time period between times A and D the number "one" is stored in register 10. The conversion sequence will (beginning at time D) now be explained assuming an input signal of +3 units. The sequence is initiated by a pulse from timer 26 on line 26*c* which actuates modulator 24. Since the number one is stored in output register 10, a modulated signal having a magnitude of one unit appears at the output of modulator 24. The reference signal passes through transformer 14 and is summed with the input voltage appearing at terminals 12. At time E the switches 16 are closed and an error signal appears at the input of differential amplifier 18. Since the magnitude of the reference voltage is −1 unit and the magnitude of the input is +3 units, the error signal at this time has a magnitude of +2 units. The error signal passes through differential amplifier 18 through transformer 15 to level detector 20. Level detector 20 generates a pulse on output 20*a.* At time F a sample pulse appears on line 26*b* and hence a pulse is gated through circuit 21 to sequential control circuit 22. Thereafter, at time G a pulse appears on line 26*a* and in response thereto sequential control circuit 22 increments the number stored in output register 10. This increases the reference voltage to −2 units and the process repeats itself. Sequential control circuit 22 only generates a pulse on line 22*a* in response to a pulse on line 26*a* if a pulse appeared on line 21*a* a short time previously. Note that switches 16 are closed during the negative part of the modulated reference. On the third cycle the reference voltage is increased to −3 units and since the magnitude of the input is +3 units, an error signal of zero units appears at the input of differential amplifier 18 and level detector 20 does not generate a signal on line 20*a.* Thus, sequential control circuit 22 does not generate a signal on line 22*a* to increment the number stored in output register 10 and the conversion is complete.

Figure 3:
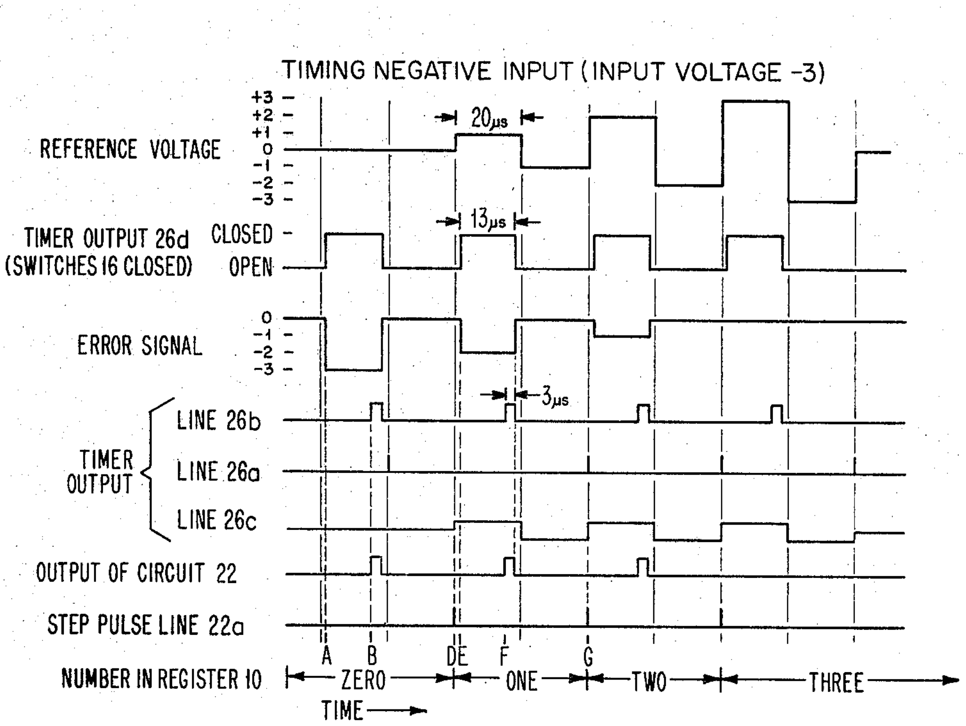
FIGURE 3 shows the waveforms during a negative conversion.

The sequence which occurs during the conversion of a negative input is shown in FIGURE 3. The major difference (after time D) is that switches 16 are closed during the positive phase of the modulated reference signal. The reason for this is that when the input signal is negative, it must be added to a positive signal in order to generate an error signal which represents the difference between the input signal and the reference signal. When the input signal is positive (FIGURE 2) the switches 16 are closed during the negative portion of the modulated reference so that an error signal is generated which represents the difference between the input signal and the reference signal. The relationship between pulses on timer outputs 26*d* and 26*c* control the relationship between the phase of the modulated reference and the time switches 16 are closed.

The portion of the conversion cycle between times A and D will now be explained. It is during this portion of the cycle that the polarity of the input is determined. Reference will first be made to FIGURE 2 which shows a positive input signal having a magnitude of +3 units. Prior to time A, the output register 10 is reset to zero and the magnitude of the reference voltage is therefore zero. The conversion begins when a start pulse is applied to timer input 26*s.* In FIGURE 2 this is designated as time A. At time A switches 16*a* and 16*b* are closed thereby gating the input voltage to differential amplifier 18. When switches 16 are closed the error signal is positive and it has a magnitude of three units. This signal is amplified by differential amplifier 18 and transmitted through transformer 15 to level detector 20. Level detector 20 detects this signal and it sends a signal to AND gate 21. At time B timer 26 generates a pulse on line 26*b.* In response to the pulse on line 26*b* and the signal on line 20*a,* AND gate 21 generates a signal on line 21*a.* Sequential control circuit 22 detects this pulse and in response thereto generates a pulse on line 22*a* at time D. The pulse on line 22*a* increments the number in output register 10 from zero to one.

Polarity detector 27 detects the positive signal at the output of transformer 15 after time A and in response thereto activates line 27*p.* Activation of line 27*p* causes the timer 26 to generate the pulses on lines 26*b* and 26*d* during negative half of the modulator synchronizing signal on line 26*c.* If the polarity detector 27 detects a negative output from transformer 15 it activates line 27*n.* If timer 26 detects a signal on line 27*n* rather than 27*p,* between times A and D it generates timing signals on lines 26*b* and 26*d* during the positive half of the signal on line 26*c.* One other difference between a positive and a negative conversion is that the conversion of a positive input ends when polarity detector 27 detects a negative signal at the output of transformer 15 while the conversion of a negative input ends when polarity detector 27 detects a positive signal at the output of transformer 15. A period of delay is provided between times C and D to allow the circuitry to settle. The following is a specific example of the speed at which this converter can operate. The modulator can have a period of forty microseconds, the switches 16 can be closed for thirteen microseconds and the sample pulse for the output of the level detector can be three microseconds. The pulse which changes the state of register 10 can be many times shorter. Its exact length depends upon the switching speed of the electronic circuitry used.

Figure 4:
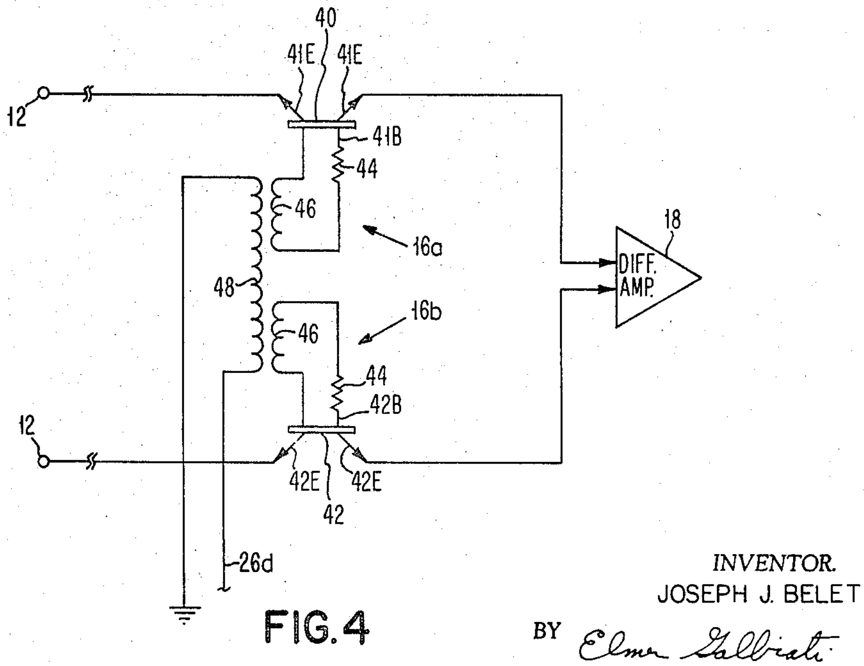
FIGURE 4 shows the details of the line switches.

The details of switches 16*a* and 16*b* are shown in FIGURE 4. Each switch consists of a double emitter transistor respectively designated 41 and 42. Such transistors are commercially available, e.g., these transistors can be the transistors which are commercially designated 3N74. Each double emitter transistor has two emitters. The emitters on transistor 41 are designated 41E and the emitters on transistor 42 are designated 42E. Each transistor also has a base lead and a collector lead. On transistor 41 these are designated respectively 41B and 41C and on transistor 42 these are respectively designated 42B and 42C.

A double emitter transistor operates much like a switch which is normally opened. The switching terminals are the two emitter terminals. The circuit between the two emitter terminals is open except when a voltage is applied between the base and the collector terminals. The base and the collector terminals of each double emitter transistor are connected together through the winding of a transformer 46 and a resistor 44. The windings 46 form the secondary winding of a transformer. The primary winding of this transformer is designated 48 and is connected in series with output **26*d* from timer 26. Thus, when a pulse is applied to line 26*d*, a voltage is induced between the base and the collector of each of the double emitter transistors 41 and 42** thereby closing the circuit between the emitters of these transistors.

It is noted that resistor **11*a* is placed in the circuit in order to provide a convenient way of adding the input voltage and the reference signal. Resistor 11*b*** is placed in the other input line in order to balance the two input lines.

As shown herein the signals are transmitted from the floating section to the remaining portion of the circuitry via transformers. Other types of signal transmitters which maintain electrostatic isolation could also be used. For example, each transformer could be replaced by a light source and a photoreceptor.

Various ranges of input signals can easily be accommodated by placing a plurality of attenuating resistors across the output of the modulator. Different ranges of input signals can be accommodated by connecting different resistors into the circuit.

Various modifications of the embodiment of the invention shown herein are possible without departing from the spirit and scope of the present invention. For example, herein a simple type of sequential converter is shown wherein the conversion begins with zero in the output register and wherein the value in the output register is sequentially increased until the reference voltage equals the input voltage. It is known in the art that various other sequences have advantages. For example, it is known that by initially setting the output register to its midvalue and by then counting up or down depending upon the polarity of the error signal, one can perform a conversion with a minimum number of steps. However, such modifications are well known in the art and they form no part of the present invention. Thus, various other types of analog to digital converters could still utilize the present invention.

The input section 13 has been described as electrostatically isolated. The term "electrostatically isolated" is intended to mean that section 13 is electrically isolated from ground and from the remaining portions of the circuitry except for the signals transmitted through transformers 14, 15 and 48. Even the three transformers should be shielded to prevent the transmission of spurious voltages. Such transformers are commercially available. The remaining portions of the circuitry in section 13 are mounted with electrically insulating material. Furthermore, the entire section 13 may be enclosed in a metal box to prevent the accumulation of stray voltages. This box can be connected to the system ground and the circuitry inside of the box electrically isolated from the box. Such shielding techniques are well known.

The polarity detector 27 is herein shown as connected to the output of transformer 15 and polarity detector 27 is described as containing circuitry which detects both positive and negative pulses and appropriately activates lines **27*p* and 27*m*. Alternately, polarity detector 27 could be connected to the output of AND circuit 21. In this case polarity detector 27** would only need detect positive voltages.

In the previous description it was stated that the output of modulator 24 is zero when the number zero is stored in output register 10. In order to compensate for the offset voltages such as the offset voltages in switches **16*a* and 16*b*, the system can initially be adjusted so that when terminals 12 are shorted the level detector 20** is at its threshold, that is, it only gives an indication fifty percent of the time. This would tune or adjust the circuit to its maximum sensitivity.

It is noted that differential amplifier 18 and level detector 20 need not be linear circuits. Furthermore, the converter is insensitive to any offset voltages in differential amplifier 18 since this amplifier in effect only amplifies voltage changes.

While the invention has been particularly shown and described with reference to preferred embodiments thereof, it will be understood by those skilled in the art that the foregoing and other changes in the form and details may be made therein without departing from the spirit and scope of the invention.

What is claimed is

1. A circuit for converting an analog input signal to a number comprising:

a digital register for storing a number;
means for generating a DC reference signal, the magnitude of which is related to the number stored in said register;
means for modulating said DC reference signal;
an electrostatically isolated input section;
means for transforming said modulated reference signal to said input section;
means for adding said reference signal in modulated form to said input signal to generate a signal which represents the sum of said modulated reference signal and said input signal;
means for periodically sampling said sum when the polarity of said modulated reference signal and of said input signal differ;
a level detector;
means for transmitting said sampled sum from said input section to said level detector, and
means for changing the magnitude of said digital number stored in said register in response to said level detector until said sum equals zero whereby the magnitude of said reference signal represents the magnitude of said input signal.

2. An analog to digital converter comprising:

a floating section which is electrostatically isolated;
means for supplying a differential analog input voltage to said floating section;
means for generating a modulated reference voltage;
means for transmitting said modulated reference voltage to said floating section;
means for summing said reference voltage in modulated form to said analog input voltage to generate a signal which represents the sum of said modulated reference voltage and said input voltage;
means for periodically sampling said summation voltage when the polarity of said modulated reference voltage is opposite to the polarity of said analog input voltage, and
means for changing the magnitude of said modulated reference voltage until said summation voltage is zero whereby the magnitude of said reference voltage represents the magnitude of said input signal.

3. An analog to digital converter comprising:

means for generating a DC reference signal;
means for modulating said DC reference signal;
a floating input section which is electrostatically isolated;
means for transforming said modulated reference signal to said floating section;
means for adding said reference signal in modulated form to said input signal to generate a signal which represents the sum of said modulated reference signal and said input signal;
a level detector;
means for transmitting said sampled sum from said floating section to said level detector, and
means for changing the magnitude of said reference signal in response to said sum until said sum equals zero whereby the magnitude of said reference signal represents the magnitude of said input signal.

4. A circuit for converting an analog input signal to a digital number comprising:
- a register for storing a digital number;
- means for generating a reference signal, the magnitude of which is related to the number stored in said register;
- means for modulating said reference signal;
- an electrostatically isolated input section;
- means for transforming said modulated reference signal to said input section;
- means for adding said reference signal in modulated form to said input signal to generate a signal which represents the sum of said modulated reference signal and said input signal;
- means for periodically sampling said sum when the polarity of said modulated reference signal and of said input signal differ;
- a level detector;
- means for transmitting said sampled sum from said input section to said level detector, and
- means for changing the magnitude of said digital number stored in said register in response to said level detector until said sum changes polarity whereby the magnitude of said reference signal represents the magnitude of said input signal.

5. An analog to digital converter comprising:
- a floating section which is electrostatically isolated;
- means for supplying a differential analog input voltage to said floating section;
- a register for storing a digital number;
- means for generating a modulated reference voltage, the magnitude of which is controlled by the number stored in said register;
- means for transmitting said modulated reference voltage to said floating section;
- means for summing said reference voltage in modulated form to said input voltage to generate a voltage which represents the sum of said modulated reference voltage and said input voltage;
- means for periodically sampling said summation voltage when the polarity of said modulated reference voltage is opposite to the polarity of said analog input voltage;
- means for changing the number stored in said register until said summation voltage changes polarity;
- whereby the number in said register is made to represent the magnitude of said input voltage.

6. A circuit for converting an analog input signal to a digital number comprising:
- polarity determining means for determining the polarity of said input signal;
- a register for storing a digital number;

- means for generating a reference signal, the magnitude of which is related to the number stored in said register;
- means for modulating said reference signal;
- an electrostatically isolated input section;
- means for transforming said modulated reference signal to said input section;
- means for adding said reference signal in modulated form to said input signal to generate a signal which represents the sum of said modulated reference signal and said input signal;
- means responsive to said polarity determining means for periodically sampling said sum when the polarity of said modulated reference signal and of said input signal differ;
- a level detector;
- means for transmitting said sampled sum from said input section to said level detector, and
- means for changing the magnitude of said digital number stored in said register in response to said level detector until said sum equals zero whereby the magnitude of said reference signal represents the magnitude of said input signal.

7. An analog to digital converter comprising:
- means for generating a reference signal;
- means for modulating said reference signal;
- a floating input section which is electrostatically isolated;
- transformer means for transmitting said modulated reference signal to said floating section;
- means for adding said reference signal in modulated form to said input signal to generate a signal which represents the sum of said modulated reference signal and said input signal;
- means for periodically sampling said sum when the polarity of said input and of said modulated reference differ;
- a level detector;
- transformer means for transmitting said sampled sum from said floating section to said level detector, and
- means for changing the magnitude of said reference signal in response to said sum until said sum changes polarity whereby the magnitude of said reference signal represents the magnitude of said input signal.

References Cited

UNITED STATES PATENTS

| | | | |
|---|---|---|---|
| 3,130,373 | 4/1964 | Braymer | 330—9 |
| 3,216,003 | 11/1965 | Funk et al. | 340—347 |

MAYNARD R. WILBUR, *Primary Examiner.*

J. GLASSMAN, *Assistant Examiner.*